United States Patent
Soares et al.

(10) Patent No.: US 11,192,666 B2
(45) Date of Patent: Dec. 7, 2021

(54) MAGNETIC DAMPING FOR SPACE VEHICLES AFTER END-OF-LIFE

(71) Applicant: European Space Agency, Paris (FR)

(72) Inventors: Tiago Soares, Noordwijk (NL);
Antonio Caiazzo, Noordwijk (NL);
Andrew Wolahan, Noordwijk (NL)

(73) Assignee: European Space Agency, Paris (FR)

( * ) Notice: Subject to any disclaimer, the term of this patent is extended or adjusted under 35 U.S.C. 154(b) by 0 days.

(21) Appl. No.: 16/909,769

(22) Filed: Jun. 23, 2020

(65) Prior Publication Data

US 2020/0407083 A1    Dec. 31, 2020

(30) Foreign Application Priority Data

Jun. 25, 2019  (EP) .................................... 19182205

(51) Int. Cl.
| | | |
|---|---|---|
| *B64G 1/32* | (2006.01) | |
| *B64G 1/36* | (2006.01) | |
| *B64G 1/66* | (2006.01) | |
| *H02H 7/00* | (2006.01) | |
| *B64G 1/22* | (2006.01) | |

(52) U.S. Cl.
CPC ............. *B64G 1/366* (2013.01); *B64G 1/32* (2013.01); *B64G 1/66* (2013.01); *H02H 7/00* (2013.01); *B64G 2001/228* (2013.01)

(58) Field of Classification Search
CPC . B64G 1/366; B64G 1/32; B64G 1/66; B64G 2001/228; H02H 7/00
See application file for complete search history.

(56) References Cited

U.S. PATENT DOCUMENTS

| | | | | |
|---|---|---|---|---|
| 3,232,561 A | * | 2/1966 | Adams ................. | B64G 1/32 244/166 |
| 3,652,033 A | * | 3/1972 | Wyatt ................. | B64G 1/32 244/166 |
| 6,116,544 A | * | 9/2000 | Forward .............. | B64G 1/421 244/158.2 |
| 2014/0034784 A1 | * | 2/2014 | Forestier ............. | B64G 1/242 244/158.6 |

FOREIGN PATENT DOCUMENTS

WO    2018/093761 A1    5/2018

OTHER PUBLICATIONS

Extended European Search Report for EP Application No. 19182205.5 dated Dec. 20, 2019, 7 pages.

* cited by examiner

*Primary Examiner* — Justin M Benedik
(74) *Attorney, Agent, or Firm* — Seed Intellectual Property Law Group LLP

(57) ABSTRACT

A space vehicle includes one or more magnetorquers operable to change an attitude of the space vehicle in an external magnetic field, each magnetorquer comprising a coil, and a switching circuit for short-circuiting the coil of at least one of the magnetorquers so that a closed electric circuit comprising said coil is formed, for damping tumbling motion of the space vehicle in the external magnetic field. The switching circuit is configured to short-circuit the coil of the at least one magnetorquer upon occurrence of a condition indicative of end-of-life or failure of the space vehicle. The application further relates to a corresponding method of operating a space vehicle.

15 Claims, 6 Drawing Sheets

MAGNETIC DAMPING FOR SPACE VEHICLES AFTER END-OF-LIFE

BACKGROUND

Technical Field

This application relates to space vehicles (spacecraft, e.g., satellites) comprising one or more magnetorquers and to methods of operating such space vehicles. In particular, the application relates to space vehicles designed to be serviced or removed from orbit after failure or end-of-life (EOL) of the space vehicle, and to corresponding methods of operating space vehicles.

Description of the Related Art

A safe and secure space environment is a requirement for all current and future space activities and the problem of space debris represents a treat for future space sustainability. Analyses performed by ESA and NASA indicate that the only means of sustaining the orbital environment at a safe level for space operations will be by carrying out both active debris removal and end-of-life de-orbiting or re-orbiting of future space assets. ESA, through its Clean Space initiative, is devoting an increasing amount of attention to this problem, including activities for debris removal.

Service and removal missions, such as, for example, Active Debris Removal (ADR), have a number of technical challenges and risks in terms of rendezvous and capture of the non-operational space vehicle (e.g., satellite). One of the main sources of risk for such a mission is achieving the necessary attitude for capture, considering the target's tumbling motion.

Observation shows that satellites after the end of operations may increase their angular rate vector magnitude. For example, for satellites in Low Earth Orbits (LEO), ground observations show average values of about 2 deg/s (degrees per second), but there are observed cases with angular rate vector magnitudes of up to 20 deg/s. However, high angular rates exponentially increase the complexity and risk of any servicing or removal missions, and can also result in break-up and fragmentation of the satellite itself. Since the observed angular rates of on average about 2 deg/s turn out to significantly impede any servicing or removal from orbit of the satellite after end-of-life or in the event of any failure, damping of the tumbling motion is key to for simplifying such operations.

Thus, there is a need for improved techniques for damping of tumbling motion of space vehicles (e.g., satellites), especially after failure or end-of-life of the space vehicles. There is particular need for such techniques that do not impose additional constraints (e.g., with regard to design, mass, size, etc.) on space vehicles implementing these techniques.

BRIEF SUMMARY

In view of some or all of these needs, the present disclosure proposes a space vehicle and a method of operating a space vehicle, having the features of the respective independent claims.

An aspect of the disclosure relates to a space vehicle. The space vehicle may be a satellite, for example. The space vehicle may include one or more magnetorquers operable to change an attitude (e.g., orientation) of the space vehicle in an external magnetic field. That is, the magnetorquers may be capable of changing the space vehicle's attitude when the space vehicle is present in the external magnetic field, such as Earth's magnetic field. For example, the space vehicle may include three or more magnetorquers, such as one magnetorquer for each of three mutually perpendicular axes. Each magnetorquer may include a respective coil. The space vehicle may further include a switching circuit for short-circuiting the coil of at least one of the magnetorquers, so that a closed electric circuit comprising said coil is formed, for damping tumbling motion of the space vehicle in the external magnetic field. Short-circuiting the coil may mean (directly) connecting the two terminals of the coil to each other. For example, each (i.e., all) of the one or more magnetorquers may be short-circuited, to achieve damping along all three axes. In such case, a respective closed electric circuit may be formed across each coil. The switching circuit may be configured to short-circuit the coil of the at least one magnetorquer upon occurrence of a condition indicative of end-of-life or failure of the space vehicle. The switching circuit may be formed of, or comprise, a switch (e.g., a mechanical switch or relay switch). It is understood that the coils of the magnetorquers are not shorted during nominal operation of the space vehicle, in which case the magnetorquers operate, for example, under control of a driver for the magnetorquers (magnetorquer driver) to control the space vehicle's attitude.

Configured as proposed, electric currents will be induced in the short-circuited magnetorquer(s) upon rotational movement of the space vehicle (e.g., satellite) in the external magnetic field (e.g., Earth's magnetic field), assuming that the rotational movement results in a time-dependent magnetic flux in the short-circuited magnetorquer(s). These currents will produce a magnetic moment of the respective magnetorquers that interact with the external magnetic field to slow down the rotational movement. Thereby, rotational movement of the space vehicle is damped by the short-circuited magnetorquers. In consequence, the proposed technique achieves magnetic damping of tumbling motion of the space vehicle after failure or end-of-life.

The magnetic damping provided by the proposed technique is particularly applicable to space vehicles in LEO, in which Earth's magnetic field is comparatively strong. Notably, LEO is the most populated orbit for Earth observation and telecommunication constellations, and the servicing or removal of space vehicles after failure or end-of-life would be most relevant for this orbital region.

As has been shown in simulations, the proposed technique allows damping of tumbling motion down to angular rates below 0.5 deg/s in few months, which allows for comparatively safe servicing or removal of the space vehicle.

Assuming that the magnetorquers are present in the space vehicle anyway (as is the case for typical LEO space vehicles), the proposed technique only imposes minimal system impact on the space vehicle.

Moreover, the magnetic damping is not present during normal operation of the space vehicle (during which the magnetorquers are used for controlling an attitude of the space vehicle), so that operation efficiency of the space vehicle is not affected by the proposed technique.

The Space Debris regulation defines the LEO protected region to extend up to 2000 km altitude. In the context of the present disclosure, LEO may thus be understood to relate to any orbit around Earth with 2000 km altitude or less.

In some embodiments, the short-circuiting of the coil of the at least one magnetorquer by the switching circuit may be performed in reversible manner.

In some embodiments, the switching circuit may be configured to open and thereby break the closed electric circuit upon detection of a second condition indicative of a temporary failure of the space vehicle having ended.

Accordingly, the coil may be un-shorted if necessary, so that the respective magnetorquers can be used again for changing/controlling the attitude of the space vehicle, for example after the space vehicle has been recovered from failure. Likewise, an external control signal (e.g., from ground) for opening the closed electric circuit may be feasible in this context.

In some embodiments, the switching circuit may include a switch that, when closed, short-circuits the coil of the at least one magnetorquer. This switch may be a normal close type switch.

Thereby, it is ensured that the magnetorquers are short circuited and magnetic damping of tumbling motion sets in once there is no power on the main bus of the space vehicle anymore, which may indicate failure or end-of-life of the space vehicle. In this case, the aforementioned condition corresponds to the fact that current, power, etc., for holding the switch in the open position is no longer available.

In some embodiments, the space vehicle may include a control unit for controlling operation of the space vehicle. The control unit of the space vehicle may be a control computer, for example. Then, the condition indicative of end-of-life or failure of the space vehicle may be detected if the control unit is not responsive to a status request. The status request may comprise a flag or a ping, for example.

Thereby, it is ensured that the magnetorquers are short circuited and magnetic damping of tumbling motion sets in once the space vehicle is assumed to not be under control of the control unit anymore.

In some embodiments, the switching circuit may include a detector configured to issue a status request to the control unit and to detect the condition indicative of end-of-life or failure of the space vehicle if there is no response from the control unit to the status request within a predetermined period of time. The status request may comprise a flag or a ping, for example.

In some embodiments, the switching circuit may be configured to short-circuit the coil of the at least one magnetorquer upon reception of an external control signal by the space vehicle. Likewise, external control signals for un-shorting the closed electric circuit may be feasible as well. The external control signal may be a control signal from ground, for example.

Thereby, additional control over the magnetic damping of tumbling motion of the space vehicle is provided for.

In some embodiments, the magnetorquers may each further include a ferromagnetic core, with the respective magnetorquer's coil wound around the ferromagnetic core. Then, the coil may be wound around the ferromagnetic core in a single layer of windings. This may imply that the ferromagnetic core is longer than in conventional magnetorquers, and/or has a larger diameter, which corresponds to an optimization of the magnetorquers for the inventive purpose. Further optimizations may include increasing ferromagnetic core's magnetic permeability, as well as increasing the diameter of the coil wire and/or reducing its electric resistance. All these optimizations will increase the efficiency of the magnetic damping resulting from induction of an electric current in the closed-circuited magnetorquer moving within the external magnetic field.

Another aspect of the disclosure relates to a method of operating a space vehicle with one or more magnetorquers operable to change an attitude of the space vehicle in an external magnetic field. Each magnetorquer may include a coil. The method may include detecting a condition indicative of end-of-life or failure of the space vehicle. The method may further include, upon detection of the condition, short-circuiting the coil of at least one of the magnetorquers so that a closed electric circuit comprising said coil is formed, for damping tumbling motion of the space vehicle in the external magnetic field.

In some embodiments, the short-circuiting of the coil of the at least one magnetorquer may be performed in a reversible manner.

In some embodiments, the method may further include breaking the closed electric circuit upon detection of a second condition indicative of a temporary failure of the space vehicle having ended.

In some embodiments, the short-circuiting of the coil of the at least one magnetorquer may be performed by a switch that, when closed, short-circuits the coil of the at least one magnetorquer. This switch may be a normal close type switch.

In some embodiments, the method may further include issuing a status request to a control unit of the space vehicle. The method may yet further include detecting the condition indicative of end-of-life or failure of the space vehicle if there is no response from the control unit to the status request within a predetermined period of time.

In some embodiments, the method may further include short-circuiting the coil of the at least one magnetorquer upon reception of an external control signal by the space vehicle.

It will be appreciated that apparatus features and method steps may be interchanged in many ways. In particular, the details of the disclosed apparatus (e.g., space vehicle) can be realized by the corresponding method of operating the apparatus, and vice versa, as the skilled person will appreciate. Moreover, any of the above statements made with respect to the apparatus are understood to likewise apply to the corresponding method, and vice versa.

BRIEF DESCRIPTION OF THE SEVERAL VIEWS OF THE DRAWINGS

Example embodiments of the disclosure are explained below with reference to the accompanying drawings, wherein.

DETAILED DESCRIPTION

In the following, example embodiments of the disclosure will be described with reference to the appended figures.

Identical elements in the figures may be indicated by identical reference numbers, and repeated description thereof may be omitted.

Broadly speaking, the present disclosure lies in the technical field of Space System Control, in the framework of Attitude and Orbit Control System (AOCS) actuator technology as a passive attitude control technique activated autonomously after end-of-life or a major space vehicle (e.g., satellite) failure, using attitude control actuators and triggering technologies mounted on-board.

The present disclosure aims to ease and de-risk future service and removal missions, such as, for example, ADR missions and de-orbiting operations, by providing passive stabilization of the target space vehicle. Furthermore, the present disclosure can mitigate the risk of fragmentation events and breaking-up of the space vehicle structure due to high-speed tumbling rates, which today is one of the main contributors to in-orbit fragmentation events.

As such, the present disclosure relates to passive angular rate magnitude damping of space vehicles after/during failure or after end-of-life. This entails intentionally adding magnetic damping systems to the space vehicles to enhance energy dissipation rate and ability to generate currents when moving through Earth's magnetic field in order to generate magnetic torques that stabilize/damp the tumbling motion of the space vehicle and to ease removal and deorbiting operations.

This function is included in an optimal way by using magnetorquers that are present anyway in typical space vehicles, and dedicated triggering technology to activate the damping system at the end-of-life or after failure of the space vehicle. In this context, it is assumed that the magnetorquers are properly designed and located on-board the space vehicle, which is typically the case if the magnetorquers are usable for controlling the attitude of the space vehicle.

As noted above, damping of tumbling motion of space vehicles after/during failure or after end-of-life are important requirements for enabling servicing or removal of the space vehicles. A number of methods and systems are feasible for such damping of tumbling motion. Examples of passive detumbling systems are illustrated in FIG. 1A and FIG. 1B.

Figure 1A:
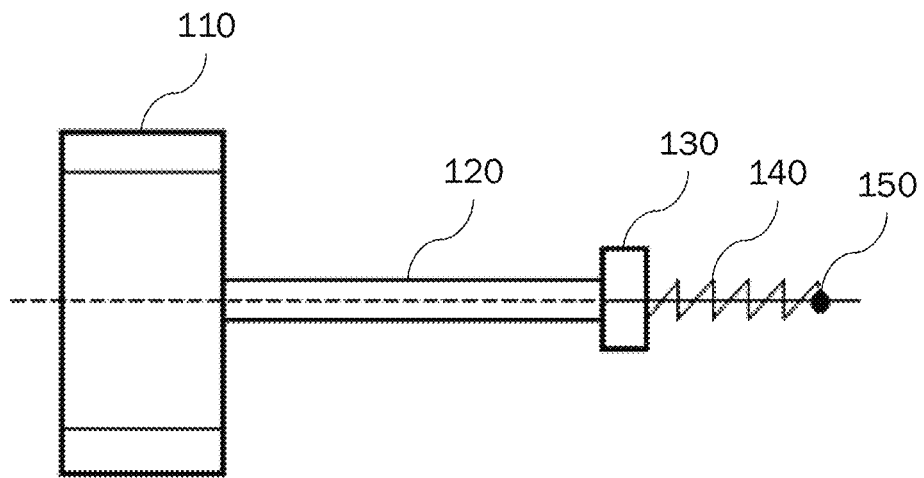
FIG. 1A and FIG. 1B schematically illustrate examples of mechanisms for damping motion of a space vehicle, FIG. 2 schematically illustrates behavior of a space vehicle equipped with a magnetorquer in Earth's magnetic field, FIG. 3A and FIG. 3B schematically illustrate examples of forces acting on a short-circuited magnetorquer in an external magnetic field, FIG. 4 schematically illustrates an example of a magnetorquer and a corresponding switching circuit for use in a space vehicle, according to embodiments of the present disclosure, FIG. 5 schematically illustrates an example of a space vehicle according to embodiments of the present disclosure, including the magnetorquer and the switching circuit shown in FIG. 4, and FIG. 6 schematically illustrates an example of a method of operating a space vehicle according to embodiments of the present disclosure.

An example of a mechanical vibration damper for a satellite is shown in FIG. 1A. A satellite body 110 is coupled to a tip mass 130 through a boom 120. A small mass 150 is coupled to the tip mass 130 through a spring 140. Vibrations of the satellite will induce motion of the small mass 150 and associated therewith, elongation or compression of the spring 140. Thereby, the spring 140 will slowly dissipate the kinetic energy of the vibrations.

Figure 1B:
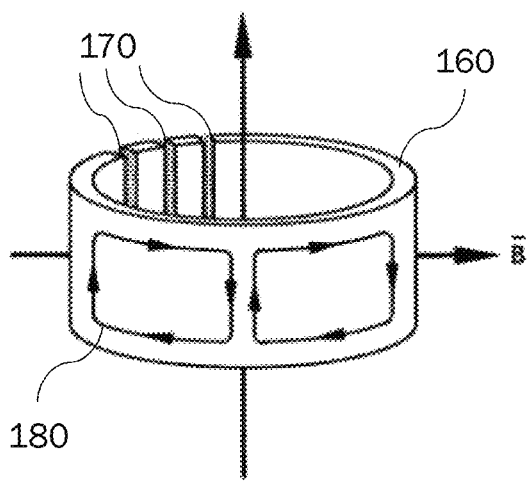

An example of an eddy current enhancer is shown in FIG. 1B. The eddy current enhancer comprises a conductive ring or barrel 160 with insulation elements 170 embedded in the wall of the barrel 170, extending along the rotational axis of the barrel 160. The barrel 160 is shaped so that eddy currents 180 can form within the barrel wall, thereby dissipating energy.

Alternative solutions for detumbling systems include particle or fluid dampers as passive dampers that are mounted inside the satellite. The energy dissipated by the particles or fluid helps to damp the oscillatory motion of the satellite. The nutation of the satellite excites fluid oscillations in the damper tubes and kinetic energy is converted to heat, therefore the nutation is reduced.

What is common to the above detumbling systems is that they suffer from development costs issues, low technology readiness level, and high impact in terms of added mass and accommodation constraints on the host satellite. Moreover, the above detumbling systems may also counteract desired changes of attitude of the space vehicle during normal operation, thereby decreasing operation efficiency of the space vehicle.

The present disclosure proposes to use magnetorquers that already exist within a space vehicle for detumbling purposes after failure or end-of-life. Magnetorquers are an established technology mainly used in small, medium and large spacecraft operating in LEO and can provide control torques perpendicular to the local external magnetic field. Magnetorquers are often used in combination with reaction wheels to remove excess momentum.

In addition to making use of the magnetorquers already on board, the present disclosure proposes implementing a dedicated trigger technology that will short-circuit the magnetorquer(s) at the end-of-life or in the case of a major failure of the space vehicle. The tumbling motion of the space vehicle with short-circuited magnetorquers will induce currents in the magnetorquers and create respective magnetic fields, dissipating the kinetic energy. Following this approach allows integrating the detumbling function with an extremely limited system level impact in terms of mass and costs on the host space vehicle compared to alternative solutions.

A typical magnetorquer comprises a coil and a ferromagnetic core. The coil is arranged (e.g., wound) around the ferromagnetic core with a defined area and number of loops, according to the required performance of the magnetorquer. There are different ways to obtain (e.g., wind) the coil, thus there may be different types of magnetorquers, depending on the construction strategy. Embodiments of the present disclosure are applicable to any such type of magnetorquer, as long as it comprises a coil.

The present disclosure is partially based on the fact that passive attitude stabilization can be achieved by making use of the magnetorquers, exploiting the fact that a magnet, which is mounted on a space vehicle (e.g., satellite), will always attempt to align its magnetic field (magnetic moment) with the local external magnetic field. In the presence of a varying magnetic field, loop electric currents are generated in conductive materials, which generate an opposing magnetic field to the external field that has initially produced them.

As such, the technique proposed by the present disclosure is applicable to any space vehicle (e.g., satellite) that comprises one or more magnetorquers. Typically, space vehicles designed for operation in LEO comprise one or more magnetorquers, although the present disclosure should not be understood to be limited to space vehicles designed for LEO and is applicable to other space vehicles as well, as long as they comprise one or more magnetorquers.

It is understood that, during normal operation, the magnetorquers are operable to control/change an attitude of the space vehicle in an external magnetic field, such as Earth's magnetic field. For such space vehicle, it is proposed to deliberately short-circuit any or all of the space vehicle's magnetorquers. Preferably, all of the space vehicle's magnetorquers are short-circuited. Then, if the space vehicle performs rotational movement (possibly including nutation and/or precession), loop currents will be induced in the coils of the short-circuited magnetorquers (at least for those magnetorquers for which a magnetic flux through the respective coil is time-dependent due to the rotational movement). For short-circuiting (shorting) the magnetorquer(s), the space vehicle comprises a switching circuit. Therein, short-circuiting a magnetorquer is understood to be equivalent to short-circuiting the coil of that magnetorquer. The space vehicle may comprise a single switching circuit for all magnetorquers that are to be shorted, or one switching circuit for each of the magnetorquers. In any case, the switching circuits can be assumed to be virtually or conceptually integrated into a single switching circuit. To apply the magnetic damping when it is actually needed, the switching circuit is configured to short-circuit the coil(s) of the magnetorquer(s) upon occurrence of a condition indicative of end-of-life or failure of the space vehicle. It is thus important to note that the magnetorquer(s) is/are not short-circuited during nominal operation of the space vehicle. Namely, during nominal operation of the space vehicle, the magnetorquers operate under control of a driver (or respective drivers) for the magnetorquer(s), for controlling the space vehicle's attitude.

Short-circuiting the coil of at least one (possibly all) of the magnetorquers implies that a closed electric circuit comprising said coil is formed. Electric currents induced within this closed electric circuit will dissipate kinetic energy and thereby damp tumbling motion of the space vehicle in the external magnetic field.

Figure 2:
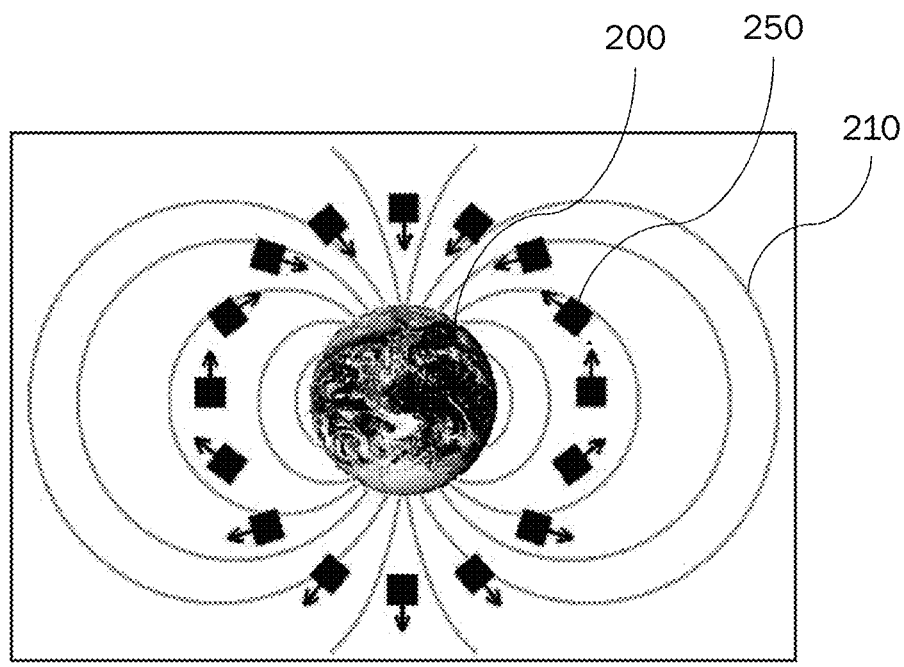

This concept is schematically illustrated in FIG. 2, which shows a space vehicle (e.g., satellite) 250 at different positions in orbit around Earth 200. The space vehicle 250 is assumed to include a magnetorquer with a magnetic moment indicated by an arrow. The magnetic moment may be generated by induced loop currents within the shorted coil of the magnetorquer, for example. The magnetic moment will always try to align with the external magnetic field 210, which may result in a magnetic torque acting upon the magnetorquer, and thereby, on the space vehicle (assuming that the magnetorquer is rigidly fixed to the space vehicle). Said magnetic torque may act to damp tumbling motion of the space vehicle. For example, the tumbling motion of the space vehicle may be stabilized at least to the extent that the angular rate of the space vehicle is reduced below a threshold angular rate that depends, among other things, on external influences.

Figure 3A:
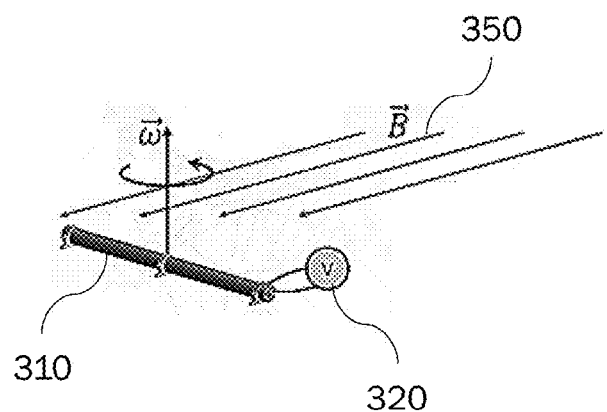
Figure 3B:
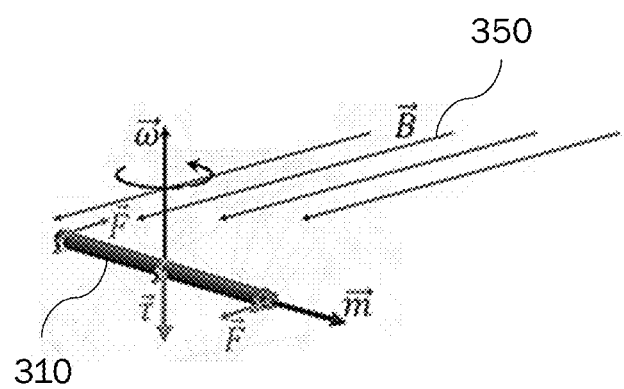

The effects of a short-circuited magnetorquer in an external magnetic field are illustrated in more detail in FIG. 3A and FIG. 3B. The magnetorquer 310 is assumed to be arranged in an external magnetic field $\vec{B}$, 350. Rotation of the magnetorquer around a rotation axis not parallel to the magnetic field $\vec{B}$ (rotation vector $\vec{\omega}$, e.g., along the vertical axis as shown in the figure) implies a time-dependent magnetic field (or time-dependent magnetic flux $\varphi$) inside the coil. The change d$\varphi$ of the magnetic flux in terms of a change of cross-sectional area $d\vec{A}$ perpendicular to the magnetic field $\vec{B}$ is given by $d\varphi=\vec{B}\cdot d\vec{A}$. The variation with time of the magnetic flux $\varphi$ will produce an electromotive force at the coil's terminals, $emf=-N\cdot d\varphi/dt$. For an open-circuit coil, this will result in a voltage V, 320, across the terminals. For a short-circuited coil however, the electromotive force implies an induced current flowing though the coil, which in turn generates a magnetic moment $\vec{m}$ of the coil. In the external magnetic field $\vec{B}$, the magnetic moment $\vec{m}$ of the coil will generate a force $\vec{F}$ and corresponding torque $\vec{\tau}$, with $\vec{\tau}=\vec{m}\times\vec{B}$ which, in accordance with Lenz's principle, will act against the rotational movement of the magnetorquer 310. Thereby, the produced torque $\vec{\tau}$ will result in an angular slowdown of the magnetorquer 310.

Notably, Earth's magnetic field can produce appreciable torques on vehicles in LEO. The torque may be lower in Medium Earth Orbit (MEO) and Geosynchronous Equatorial Orbit (GEO), respectively, which makes the proposed technique particularly applicable to space vehicles in LEO. Notably, magnetic damping in line with the above will be the more effective, the higher the angular rate.

Summarizing the above, the magnetorquers on the space vehicle, if short-circuited after end-of-life or failure, can derive benefits from the variations of the magnetic field due to the space vehicle's tumbling motion that will induce loop currents in the coils of the magnetorquers. These loop currents will create a torque opposed to the field variations and thereby, opposed to the tumbling motion, thereby providing for passive stabilization of the space vehicle. Assuming that the magnetorquers are provided in the space vehicle anyway, the proposed technique has minimum impact on the space vehicle at the system level.

To the inventors' best knowledge, this scheme based on short-circuited magnetorquers and autonomous triggers for short-circuiting the magnetorquers has not been used so far for passive stabilization of space vehicles. As noted above, this scheme provides passive attitude control and reduction of tumbling motion and thereby eases servicing and removal missions, such as, for example, active debris removal mission and de-orbiting operations.

Figure 4:
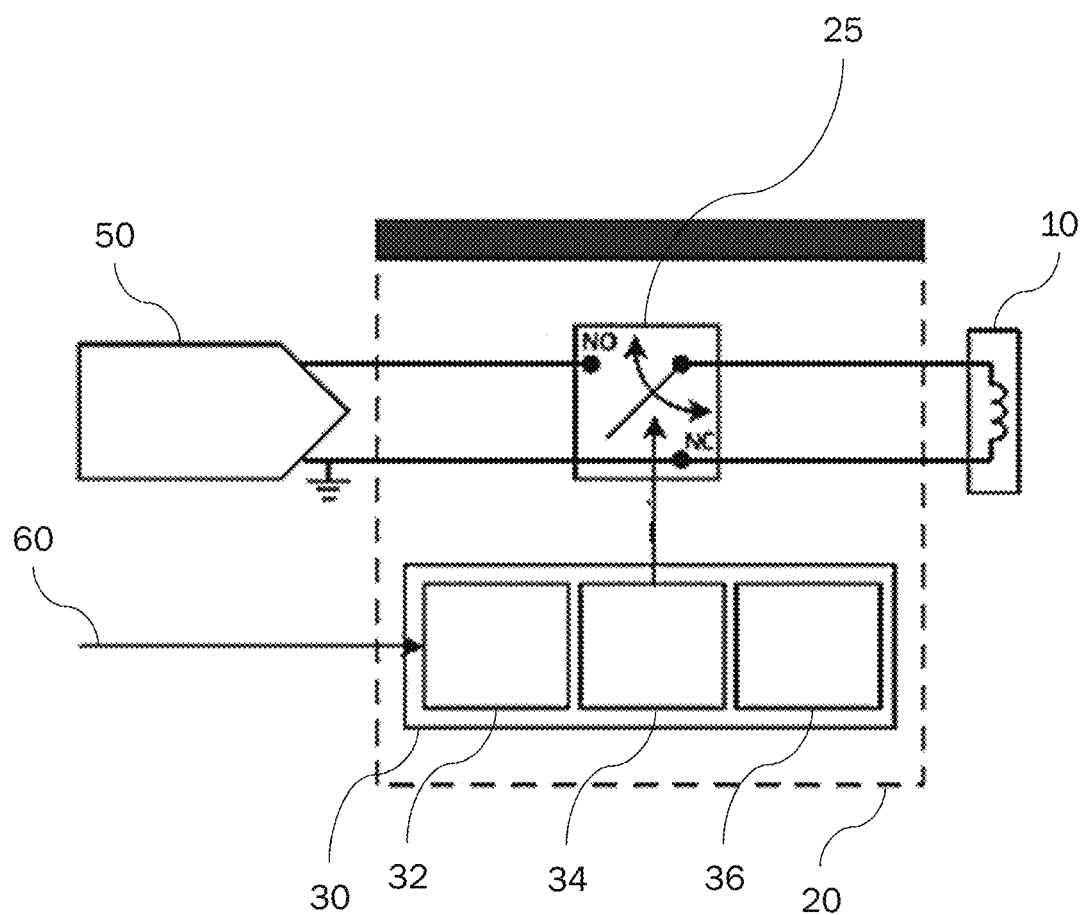

FIG. 4 illustrates an example of a magnetorquer 10 and a corresponding switching circuit 20 for use in a space vehicle, according to embodiments of the present disclosure. It is understood that the space vehicle can comprise a plurality (e.g., three) magnetorquers 10 and a single switching circuit 20 servicing all magnetorquers (at least to the extent that any such switching circuits can be conceptually or virtually integrated/combined into a single switching circuit). The switching circuit 20 comprises a switch 25 and a switching control unit 30 for controlling the switch 25. The switch 25 may be a mechanical switch or a relay switch, for example. The switching circuit 20 may comprise a respective switch 25 for each of the magnetorquers 10.

During normal operation of the space vehicle, the magnetorquer 10 is driven by a magnetorquer driver 50. To this end, the switch 25 is in a state in which the terminals of the magnetorquer 10 (i.e., the terminals of the coil of the magnetorquer 10) are connected to the magnetorquer driver 50, which can apply a voltage difference across the terminals of the coil to induce an appropriate magnetic moment in the magnetorquer 10 for the desired change of attitude of the space vehicle. It is understood that the space vehicle can comprise a single magnetorquer driver 50 servicing all magnetorquers 10, at least to the extent that any such magnetorquer drivers can be conceptually or virtually integrated/combined into a single magnetorquer driver 50.

The switch 25 may be configured such that, when it is in a first state (e.g., closed), the magnetorquer 10 is short circuited, and that when it is in the second state (e.g., open), the magnetorquer 10 not short-circuited (and connected to the magnetorquer driver 50). In such case, it can be of advantage if the switch is of a type that is normally (in the absence of activation/power) in the first state (e.g., of normal close type), so that the magnetorquer 10 is short-circuited if the space vehicle loses power or has a failure on the main power bus. For this implementation example of the switch 25, the aforementioned condition corresponds to the fact that a current or power, etc., for holding the switch in the second state (e.g., open position) is no longer present.

Alternatively or in addition, the switch 25 may operate under control of the switching control unit 30. The switching control unit 30 may comprise any or all of a telemetry and command block 32, a trigger management block 34, and an EOL detector block 36. The telemetry and command block 32 may generate a signal (e.g., flag) indicative of whether failure or end-of-life of the space vehicle has occurred based on telemetry data (e.g., data from sensors like magnetometers or gyros). The EOL detector block 35 may generate another signal (e.g., flag) indicative of whether failure or end-of-life of the space vehicle has occurred based various operation parameters of the space vehicle. For example, the EOL detector block 36 may act as a detector for detecting the condition indicative of end-of-life or failure of the space vehicle if a control unit (e.g., control computer, main computer) for controlling operation of the space vehicle is not responsive to status requests anymore. To this end, the detector may issue a status request to the control unit and detect the condition indicative of end-of-life or failure of the space vehicle if there is no response from the control unit to the status request within a predetermined period of time. The status request may comprise a flag or a ping, for example. The trigger management block 34 may issue a trigger signal for short-circuiting the magnetorquer 10 to the switch 25 if either signal or both signals indicate failure or end-of-life of the space vehicle. In general, the switching control unit 30 (e.g., trigger management block 34) may issue the trigger signal if the aforementioned condition indicative of failure or end-of-life of the space vehicle is detected. The switching control unit 30 (e.g., trigger management block 34) may further issue the trigger signal upon reception of an external control signal 60 at the space vehicle. The external control signal 60 may be a control signal from ground, for example. In this case, the switching circuit 20 may be said to short-circuit the coil of the magnetorquer 10 upon reception of the external control signal 60. As will be explained below, acting upon external control signals for breaking the closed electric circuit in the magnetorquer 10 may be feasible as well.

Figure 5:
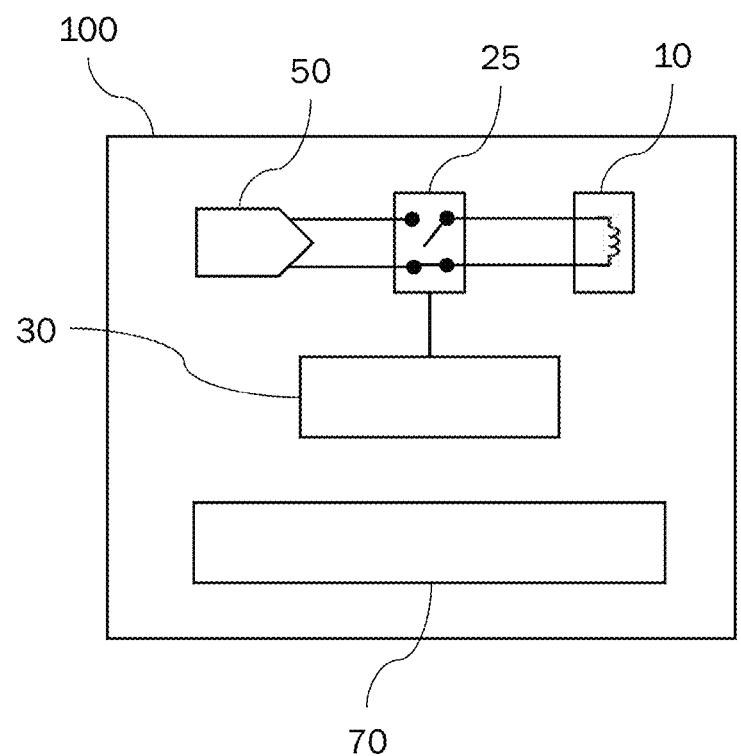

FIG. 5 schematically illustrates an example of a space vehicle 100 according to embodiments of the present disclosure, including the magnetorquer 10, the magnetorquer driver 50 and the switching circuit 20 (e.g., the switch 25 and the switching control unit 30) shown in FIG. 4. The space vehicle 100 can include further elements 70 that are necessary for operation, including, but not limited to, the control unit, for example.

When applying the proposed scheme for magnetic damping of tumbling motion of a space vehicle, it is preferred that the short-circuit of the magnetorquer shall not be triggered during nominal operational life of the host space vehicle. This can be ensured by providing a reversible trigger mechanism of the short-circuit at end-of-life or upon failure. Thus, the short-circuiting of the coil of the (at least one) magnetorquer by the switching circuit may be performed in reversible manner. This means that the coil may be un-shorted if necessary, so that the respective magnetorquer(s) can be used again for changing/controlling the attitude of the space vehicle. Also, the switching circuit 20 may be configured to break the closed electric circuit (by switching to the second state, e.g., open) upon detection of a second condition indicative of a temporary failure of the space vehicle having ended. Thus, when control over the space vehicle is regained, the magnetorquers can be un-shorted and normal operation of the space vehicle can resume. In this context, an external control signal (e.g., from ground) for breaking the closed electric circuit within the magnetorquer may be feasible as well.

As noted above, using the magnetorquers that are present in the space craft for purposes of magnetic damping of tumbling motion after end-of-life or failure of the space vehicle does not impose additional design constraints on the space vehicle. It is however understood that certain modifications of the magnetorquers, while not necessary in the context of the present disclosure, may optimize the magnetic damping after end-of-life or failure. Such modifications may include increasing the ferromagnetic core's magnetic permeability, as well as increasing the diameter of the coil wire and/or reducing its electric resistance. Further, the magnetic core may be elongated and/or increased in diameter compared to magnetorquers in use, so that there are fewer layers of coil windings on the ferromagnetic core (preferably, just one layer). Thus, it may be preferred that the ferromagnetic coil has such dimensions (length and/or diameter) so that the coil is wound around the ferromagnetic core in a single layer. All these optimizations may ease the inducing of electric currents in the short-circuited coil and/or enhance the magnetic moment generated thereby.

Next, technical results of the present disclosure will be described, which have been obtained by implementation of a laboratory prototype and by simulations. In particular, parametric simulations have been performed for space vehicles in an orbit between 400 km and 1600 km of altitude (noting that most used orbits are between 600 km and 1300 km of altitude). Without anticipating the technical results presented below, these simulations show that short-circuited magnetorquers according to embodiments of the disclosure achieve adequate magnetic damping of tumbling motion in the whole aforementioned range of altitudes.

As noted above, Earth's magnetic field can produce appreciable torques on space vehicles in LEO. Thus, the proposed combination of reusing magnetorquers and autonomous triggering of the short-circuit of magnetorquers upon end-of-life or failure can provide for efficient magnetic damping that de-risks and facilitates servicing and removal of the space vehicle. The proposed solution likewise minimizes the system impact for its implementation.

The proposed solution has been quantitatively studied through simulations based on an electromagnetic finite element model to determine the "magnetic matrix" which models the effect produced on a rotating space vehicle. The magnetic field used is obtained with a dipole model of Earth's magnetic field, integrating the field in body axis along the operational space vehicle orbit to obtain mean values. The combination of magnetic matrix and magnetic field can be used to obtain an estimation of the angular rate decay time, which behaves as an exponential decay.

The simulations discussed herewith include space vehicles identified as "Sentinel 1" and "Sentinel 3." Considering Sentinel 1 as a baseline case for the simulations (SSO orbit) spinning around the nadir axis at 3 degrees/s (0 degree/s around the other axes), short-circuiting a magnetorquer of 300 $Am^2$ dipole magnetic moment has been shown sufficient to decrease the spinning rate. It has been found that the spinning rate decreases down to 1 deg/s after about 22 months, to 0.5 deg/s after about 35 months and to 0.1 deg/s after about 65 months. Notably, presence of a 300 $Am^2$ magnetorquer is a rather conservative assumption for a space vehicle having the size of Sentinel 1, and typical magnetorquers in a space vehicle of this size can be safely assumed to be larger.

In the case of Sentinel 3 spinning around nadir at 3 deg/s, having a 800 $Am^2$ magnetic dipole short-circuited magnetorquer instead of 300 $Am^2$ reduces the time to de-tumble the satellite down to 1 deg/s by 2-10 months (going roughly from 5-19 months to 3-9 months depending on the application case, e.g., depending on whether or not the magnetorquer design has been optimized for the intended purpose, keeping a similar unit mass and magnetic dipole).

Further, as noted above, the risk of inadvertent triggering of the short-circuit is mitigated by providing for reversible short-circuiting.

Since there is no damping around the orbit normal vector in (quasi-) equatorial orbit, the proposed scheme is preferably applicable to high inclination orbits (SSO), which is the region in which ADR missions are most likely to occur. Nevertheless, simulations show that magnetic damping is still effective in quasi-equatorial orbits, except for very specific configurations. In such quasi-equatorial orbits, the space vehicle will tend to convert any initial tumbling motion to a rotation around its major axis of inertia (possibly with some nutation) that is unlikely to be and stay aligned with the orbit normal vector.

In steady-state, the spinning rate is not damped to zero, but to approximately twice the orbital rate, depending on external influences. However, damping to zero is not required for sufficiently de-risking ADR missions, for example. In fact, spinning rates of about 1 deg/s or lower are considered sufficient for a chaser to approach and safely capture the space vehicle for servicing or removal, and such spinning rates can be readily achieved by applying the present disclosure.

It should be noted that the apparatus features described above may correspond to respective method features (e.g., operating method features) that may not be explicitly described, for reasons of conciseness, and vice versa. The disclosure of the present document is considered to extend also to such methods and vice versa.

Figure 6:
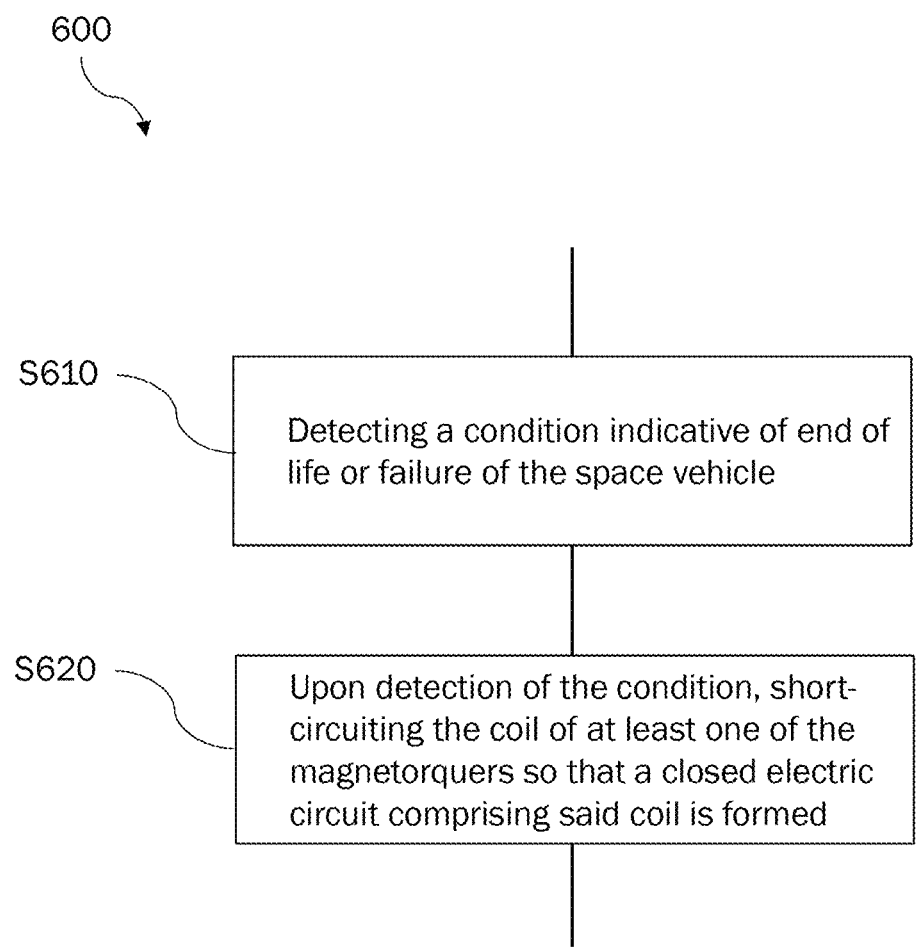

Thus, while a space vehicle in accordance with embodiments of the present disclosure has been described above, the present disclosure likewise relates to a method of operating such space vehicle. The space vehicle is assumed to comprise one or more magnetorquers operable to change an attitude of the space vehicle in an external magnetic field, with each magnetorquer comprising a coil. It is further understood that the space vehicle may have any or all of the features described above. The aim of the method is that the space vehicle benefits from magnetic damping of tumbling motion after the space vehicle's end-of-life or during/after a failure of the space vehicle. An example of such method 600 is illustrated in FIG. 6. The method 600 comprises, at step S610, detection of a condition indicative of end-of-life or failure of the space vehicle. This may involve, for example, continuously monitoring whether the condition is present. At step S620, upon detection of the condition, the coil of at least one of the magnetorquers is short-circuited so that a closed electric circuit comprising said coil is formed, for damping tumbling motion of the space vehicle in the external magnetic field. Here, the short-circuiting of the coil of the at least one magnetorquer may be performed in a reversible manner, so that the magnetorquers could, in principle, be used again for controlling the attitude of the space vehicle at later times. This may become relevant in particular in case of a temporary failure of the space vehicle element, or in case that the aforementioned condition is erroneously detected.

Accordingly, the method may further include (not shown in the figure) a step of, breaking the closed electric circuit upon detection of a second condition indicative of a temporary failure of the space vehicle having been overcome.

Detecting the condition in step S620 may include the sub-step of issuing a status request to a control unit (e.g., control computer) of the space vehicle. Then, the detecting may further include the sub-step of detecting the condition indicative of end-of-life or failure of the space vehicle if there is no response from the control unit to the status request within a predetermined period of time.

The method 600 may further comprise (not shown in the figure) short-circuiting the coil of the at least one magnetorquer upon reception of an external control signal by the space vehicle.

It is understood that any control units or blocks described above may be implemented by a computer processor or respective computer processors, or the like.

It should further be noted that the description and drawings merely illustrate the principles of the proposed method and system. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed method and system. Furthermore, all statements herein providing principles, aspects, and embodiments of the invention, as well as specific examples thereof, are intended to encompass equivalents thereof.

The various embodiments described above can be combined to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A space vehicle, comprising:
one or more magnetorquers operable to change an attitude of the space vehicle in an external magnetic field, each magnetorquer comprising a coil; and
a switching circuit for short-circuiting the coil of at least one of the magnetorquers so that a closed electric circuit comprising said coil is formed, for damping tumbling motion of the space vehicle in the external magnetic field;
wherein the switching circuit is configured to short-circuit the coil of the at least one magnetorquer upon occurrence of a condition indicative of end-of-life or failure of the space vehicle.

2. The space vehicle according to claim 1, wherein the short-circuiting of the coil of the at least one magnetorquer by the switching circuit performed in reversible manner.

3. The space vehicle according to claim 1, wherein the switching circuit is configured to open and thereby break the closed electric circuit upon detection of a second condition indicative of a temporary failure of the space vehicle having ended.

4. The space vehicle according to claim 1, wherein the switching circuit comprises a switch that, when closed, short-circuits the coil of the at least one magnetorquer; and
wherein the switch is a normal close type switch.

5. The space vehicle according to claim 1, wherein the space vehicle comprises a control unit for controlling operation of the space vehicle;
wherein the condition indicative of end-of-life or failure of the space vehicle is detected if the control unit is not responsive to a status request.

6. The space vehicle according to claim 5, wherein the switching circuit comprises a detector configured to issue the status request to the control unit and to detect the condition indicative of end-of-life or failure of the space vehicle if there is no response from the control unit to the status request within a predetermined period of time.

7. The space vehicle according to claim 1, wherein the switching circuit is configured to short-circuit the coil of the at least one magnetorquer upon reception of an external control signal by the space vehicle.

8. The space vehicle according to claim 1, wherein the magnetorquers each further comprise a ferromagnetic core, with the respective magnetorquer's coil being wound around the ferromagnetic core.

9. The space vehicle according to claim 8, wherein the coil is wound around the ferromagnetic core in a single layer of windings.

10. A method of operating a space vehicle with one or more magnetorquers operable to change an attitude of the space vehicle in an external magnetic field, each magnetorquer comprising a coil, the method comprising:
  detecting a condition indicative of end-of-life or failure of the space vehicle; and
  upon detection of the condition, short-circuiting the coil of at least one of the magnetorquers so that a closed electric circuit comprising said coil is formed, for damping tumbling motion of the space vehicle in the external magnetic field.

11. The method according to claim 10, wherein the short-circuiting of the coil of the at least one magnetorquer is performed in a reversible manner.

12. The method according to claim 10, further comprising breaking the closed electric circuit upon detection of a second condition indicative of a temporary failure of the space vehicle having ended.

13. The method according to claim 10,
  wherein the short-circuiting of the coil of the at least one magnetorquer is performed by a switch that, when closed, short-circuits the coil of the at least one magnetorquer; and
  wherein the switch is a normal close type switch.

14. The method according to claim 10, further comprising issuing a status request to a control unit of the space vehicle; and
  detecting the condition indicative of end-of-life or failure of the space vehicle if there is no response from the control unit to the status request within a predetermined period of time.

15. The method according to claim 10, further comprising short-circuiting the coil of the at least one magnetorquer upon reception of an external control signal by the space vehicle.

* * * * *